Dec. 5, 1967     H. A. BARNBY     3,356,510
METHOD AND APPARATUS FOR STERILE PACKAGING
Filed Nov. 12, 1965     4 Sheets-Sheet 1

FIG.1

INVENTOR.
HERBERT A. BARNBY
BY (DECEASED), BERNICE P.
BARNBY, EXECUTRIX.
ATTORNEYS

United States Patent Office 3,356,510
Patented Dec. 5, 1967

3,356,510
METHOD AND APPARATUS FOR STERILE PACKAGING
Herbert A. Barnby, deceased, late of Toledo, Ohio, by Bernice P. Barnby, executrix, Toledo, Ohio, assignor to Owens-Illinois, Inc., a corporation of Ohio
Filed Nov. 12, 1965, Ser. No. 507,590
22 Claims. (Cl. 99—182)

This is a continuation-in-part of copending application Ser. No. 425,241 filed Jan. 13, 1965, which is a continuation of copending application Ser. No. 160,203 filed Dec. 18, 1961, both entitled, "Method and Apparatus for Packaging." This application is also a continuation-in-part of copending application Ser. No. 285,619, filed June 5, 1963 and entitled "Sterile Food Packaging Operation," which is a continuation-in-part of said application Ser. No. 160,203. All of these earlier patent applications are now abandoned.

This invention relates to method and apparatus for packaging a liquid-containing product, such as food, and more especially relates to a method and an apparatus for packaging a sterile liquid-containing product in a container so that the interior of the sealed container, as well as the product, is sterile.

Various methods and apparatus have been developed for the packaging of liquid-containing products, such as food products, in sterile form in a sealed container which has its interior also in sterile condition. Various methods and apparatus are described in U.S. Patents Nos. 2,607,698 and 2,541,113 granted to W. Martin and H. L. Smith, Jr. et al., respectively. The Smith et al. patent describes a commercial apparatus and method in which containers, such as glass containers and tin cans, are filled to an appropriate level with the product and the containers are sealed. The sealed containers are enclosed in retorts or pressure vessels and steam is introduced under superatmospheric pressure sufficient to provide a high enough temperature to raise the container and its contents to a sterilizing temperature.

This condition is maintained for a period of time sufficient to destroy pathogenic and spoilage organisms or bacteria. Then the sealed containers are cooled while reducing the pressure in the vessel or retort to substantially atmospheric pressure. Finally, the sealed containers are cooled to approximately atmospheric temperature. The thermal destruction of spoilage organisms is a function of both time and temperature. To insure that the entire contents of the sealed containers are heated to and at a sufficient temperature for the sterilization there is a prolonged heat treatment of all of the product at temperatures above 212° F. and this adversely affects the quality of the food with respect to flavor, consistency and color.

The Martin patent describes an apparatus and a method using continuous type cookers. They include special inlet and discharge valve means that permit the entrance and the exit of the sealed and filled containers, while at the same time maintaining the superatmospheric pressure in the cookers. This apparatus is expensive and bulky and has the disadvantages of the method mentioned above as being described in the Smith et al. patent.

The Martin patent describes an approved apparatus and method that avoids some of the deficiencies in the method using the continuous type pressure cookers. This improved method uses a chamber that contains superheated steam at a temperature above 212° F.; however, the chamber is at atmospheric pressure so that ordinary inlet and discharge openings are used. When using glass containers in this method it should be apparent that the filled glass containers should be first gradually heated to a substantially high temperature to avoid breakage by theremal shock when they enter the chamber containing the superheated steam. The containers that are fed to the chamber have already been filled and sealed and the sterilization of the product is obtained by heating the product in this chamber containing the superheated steam. Again, this method requires a prolonged treatment of the food at the sterilizing temperature such that the time of treatment can result in deterioration of the product from the standpoint of flavor, etc.

The Smith et al. patent describes a method and apparatus for the sterilization of food in containers that is an improvement over the method and apparatus using the retorts or pressure vessels. In the improved apparatus and method of Smith et al. the product is heated to a sufficiently high temperature to provide a major proportion of complete sterilization. The product is cooled to a filling temperature which is still a sterilizing temperature. These operations and subsequent operations are carried out within a large room that is maintained at a superatmospheric pressure that is sufficiently highly to prevent boiling of the product at the filling temperature. This room is equipped with air locks and ventilating mechanism so that conventional filling and sealing equipment may be used and the latter may be maintained by operating personnel who enter and leave the room through air locks. Air for ventilation is fed to the room through a sterilizing apparatus.

In the Smith et al. method cans and lids are introduced into the room by belt conveyors which are valved into fluid-tight tunnels so that the room is still isolated from the outside. The cans and lids in the tunnels are subjected to steam at a pressure above the pressure in the room and the steam provides a partial sterilization of the cans and the lids. The filling temperature of the food is below the boiling point of the liquid in the food at the pressure that is maintained in the room. The product at filling temperature is flowed into the partially presterilized cans which are then closed by the partially presterilized lids using the closing machine. The can filling and closing mechanism is enclosed in a housing within the room. Steam in the tunnels passes from the tunnels through the rotary valve for the cans and lids into the housing. Steam from the housing passes into the room through the can outlet of a rotary table that is part of the filling and closing mechanism. Supplemental steam is introduced in the housing. As a result, the area immediately surrounding the filling and closing machine is filled with steam and thus is not readily accessible for maintenance by operators who would be in the rest of the room maintained at an elevated pressure.

The canned product in the Smith et al. method is held at substantially the filling temperature to complete the sterilization after the sealing by moving the sealed cans along a conveyor in an insulated zone within the room maintained at the superatmospheric pressure. The cans are cooled within the room maintained above atmospheric pressure until the product is only slightly above the atmospheric boiling point of the liquid in the product. Finally the cans are removed from the room that is at superatmospheric pressure. This removal is accomplished through a rotary valve that avoids loss of pressure in the room. It is apparent that the apparatus described by Smith et al. is expensive. It requires a large space that must be maintained at superatmospheric pressure. Other disadvantages will be apparent.

It is an object of the present invention to provide a method of packaging a liquid-containing product to produce a sealed container having a sterile interior and having sterile food within but without treatment of a filled container at a high temperature for a long period of time.

It is another object of the present invention to provide a method of packaging a liquid-containing product, which results in a sterile product in a container having a sterile interior, that permits sterilization of the product prior to filling but without prior complete sterilization of the container.

It is a further object of this invention to provide a method of producing the sealed containers having a sterile interior and containing a sterile product in which the method utilizes filling and closing equipment surrounded by atmospheric pressure so that maintenance personnel can have easy access to the equipment.

A further object of the present invention is to provide a method in which a container is filled with a sterile product and sealed without surrounding the entire container with steam at a superatmospheric pressure.

A further object of this invention is to provide a method of obtaining a sterile interior for the container in the final packaged product without overheating the product or maintaining it for too long a time at a sterilizing temperature.

Another object of this invention is to provide an apparatus of relatively simple construction that avoids the use of air locks for entry and discharge of containers while permitting filling and sealing of the containers with a sterile product.

These and other objects of the present invention will be apparent to one skilled in the art from the following description of a preferred embodiment of the present invention taken in conjunction with the drawings in which similar parts are generally designated by the same reference numerals and in which.

The method of the present invention packages a liquid-containing product in a container by the following steps: (1) sterilizing the product at a temperature substantially above the atmospheric boiling point of the liquid and under a pressure at least equal to the vapor pressure of the liquid in the product at the sterilizing temperature; (2) placing a container at least partially within a chamber; (3) providing in the chamber a predetermined elevated gaseous pressure; (4) transferring the product at a sterilizing temperature to the container in the chamber maintained at an elevated gaseous pressure sufficiently high to prevent substantial boiling of the product; (5) hermetically sealing the container; (6) releasing the gaseous pressure in the chamber; and (7) removing the hermetically sealed container from the chamber.

In step 4 it is preferred that the gaseous pressure in the chamber be at least equal to that of the liquid in the food in the container so that boiling is prevented completely. Of course, any pressure below the vapor pressure is satisfactory provided that it is sufficiently high to prevent substantial boiling of the product. A substantial boiling of the product would result in the product boiling out of the container during the filling operation. It would be on the outer surface of the container and on the walls of the filling chamber. Furthermore, such boiling would prevent the proper filling of the chamber.

The food products that are packaged by the methods of the present invention usually have water as the only liquid in the food. When any liquid other than water is present in the food with water the boiling point generally, of course, will be below 212° F.

As mentioned above, a sterilizing temperature is dependent upon the nature of the food. The spoilage bacteria that must be destroyed are dependent upon the type of food that is to be packaged. Less heat is required for equivalent sterilization for acid-containing foods than for non-acidic foods. In the case of milk and a baby food formula, that is a replacement or substitute for milk, the sterilizing temperature is preferably about 240° F. to about 260° F. For the latter products a few minutes only is necessary to completely sterilize the product. However, holding the product at this sterilizing temperature for a prolonged period of time can result in caramelizing and other deleterious effects on the flavor and other qualities of the product.

In carrying out the invention the product, such as a liquid food, can be rapidly brought up to the sterilizing temperature by being forced under mechanical pressure through a heat exchanger. The heated product is passed into a storage chamber of relatively small capacity in which the product is maintained at a sterilizing temperature, which may be less than the maximum sterilizing temperature used in the heat exchanger. The storage chamber is sufficiently small so that the residence time in that chamber is sufficiently low to avoid the deleterious effect on flavor mentioned above.

The food at the sterilizing temperature in the chamber is transferred, such as through a slide valve arrangement, to the filling chamber where it is introduced into the container while the filling chamber is being maintained under a superatmospheric gaseous pressure that is provided by the introduction into the chamber of a suitable gas that is inert to the product being packaged. In the case of food, suitable inert gases are steam, nitrogen and carbon dioxide. Steam is the preferred gas that is provided to the filling chamber and it can be obtained at a suitable pressure by communicating the top part of the storage chamber with the filling chamber. Of course, in this event the level of the food in the storage chamber is such that the upper part of the storage chamber is occupied only by steam created by the sterilized food in the storage chamber. When the hot sterilized food is fed directly to the filling chamber from a heat exchanger or other equipment such that there is no space available for steam under pressure above the food, then steam at elevated pressure is provided to the filling chamber by an independent source. It is preferred to provide a system in which steam created by the food at a sterilizing temperature in a storage chamber is introduced into the filling chamber prior to or during the filling operation so that there is automatically an equalization of pressure between the chamber containing the food at a sterilizing temperature and the filling chamber.

Although the temperature of the food or other product containing a liquid may be introduced into the container in the filling chamber at a sterilizing temperature that is less than that used to sterilize the product, the temperature of the introduced food is sufficient to sterilize the interior of the container either by direct contact with the wall portion of the container or by the temperature of its hot vapor in the vapor space of the sealed container. This sterilization is completed shortly after the sealing operation. It does not require a prolonged heating of the sealed container and its contents.

It is not necessary to preheat the container to a sterilizing temperature prior to the introduction of the product if the filling temperature of the sterile food is sufficiently high. If the filling temperature of the food, even though a sterilizing temperature, is low the loss of thermal energy of the container and its contents is minimized by passing the sealed container subsequently through a heated zone. This also eliminates the static layer that is created at the inner surface of the container by a cooler inner wall of the container. Of course, the time necessary to heat the inner surface of the container to a sterilizing temperature by heat transfer from the food at a sterilizing temterature is reduced if the container is hot when it is placed at the filling position. In the present method, preheating of the container enough to provide a sterile container is not relied upon; instead, the sterilization of the container is completed shortly after the filling and sealing operations and this is accomplished by heat transfer from the sterile food that is at a sterilizing temperature when flowed into the container.

When the container is a glass container, it is preferably preheated before placing it in the filling chamber to avoid occasional breakage of the container due to thermal shock. The glass container is preheated preferably to a temperature of at least 200° F. The preheat temperature may be insufficient to provide a sterilization of the container. When the temperature of the preheated glass container is sufficiently high for sterilization the container may be at this temperature for an insufficient time to sterilize its interior. In any event, the presterilization of the container is not required.

The present method provides for the sterilization of the container after its introduction to the filling chamber. This sterilization is completed shortly after the filling and sealing operation and does not require passing the sealed container through a long heated zone to accomplish the sterilization. The sealed container is maintained in a heated zone for a very short period of time in the present method. When the temperatures of the food at the filling operation and of the container being filled are sufficiently high, such additional heat treatment is unnecessary. As a practical matter, the filled and sealed container is passed through a short lehr to maintain the food at a sterilizing temperature and thus to complete the sterilization of the interior of the container but this does not have a deleterious effect on the quality of the product. The overall time that the food is at elevated temperatures is minimized and this avoids deterioration of quality.

The container usually has a separate closure, that is sealed on the container after the filling operation. The closure, usually made of metal, is heated by the vapors of the food in the sealed container. This sterilization of the interior of the closure is accelerated by tilting the sealed containers for direct contact between the food and the closure. It is preferred that the container be tilted to a horizontal position. When the sealed container is passed through or placed in a heated zone, the interior of the metal closure is heated rapidly to a sterilizing temperature by the food. For these reasons the closure need not be heated prior to its introduction to the filling chamber.

The apparatus of the present invention for packaging a liquid-containing food in a container comprises: (1) a closed chamber to contain the food; (2) means to heat the food to a sterilizing temperature without boiling; (3) heating means to maintain the food in the chamber at a sterilizing temperature substantially above the atmospheric boiling point of the liquid in the food and under a pressure at least equal to the vapor pressure of the liquid at the sterilizing temperature; (4) a filling chamber with an opening to receive at least part of a container; (5) means to seal hermetically the opening with the container at least partially within the filling chamber; (6) valved means to communicate the chamber containing the sterilized food with the filling chamber for flow of the food to the filling chamber; (7) means to introduce gas into the filling chamber to provide a gaseous pressure at least almost equal to the vapor pressure of the sterilized food in the filling chamber; (8) means to move the container to and from the chamber; (9) means to direct the flow of the food from the valved means into the container in the filling chamber; (10) means to hermetically seal the container at least partially within the chamber; and (11) means to release the gaseous pressure only within the filling chamber. It is preferred that the means to introduce pressurized gas into the filling chamber include valved conduit means that communicates with an upper part of the closed chamber from which the food flows into the filling chamber. In this preferred embodiment of the apparatus the closed chamber is constructed so that the food will occupy only a lower part of the closed chamber.

The filling chamber is approximately the size of a container. It may be smaller than an entire container. Of course, if the filling chamber is to be used to fill two or more containers at the same time, the filling chamber will approximate the volume occupied by these containers. The relationship between container size and the volume of the filling chamber depends upon whether or not the container is completely within the chamber during the filling operation. Under these conditions loss of gas under pressure is minimized during each cycle of operation.

Figure 1:
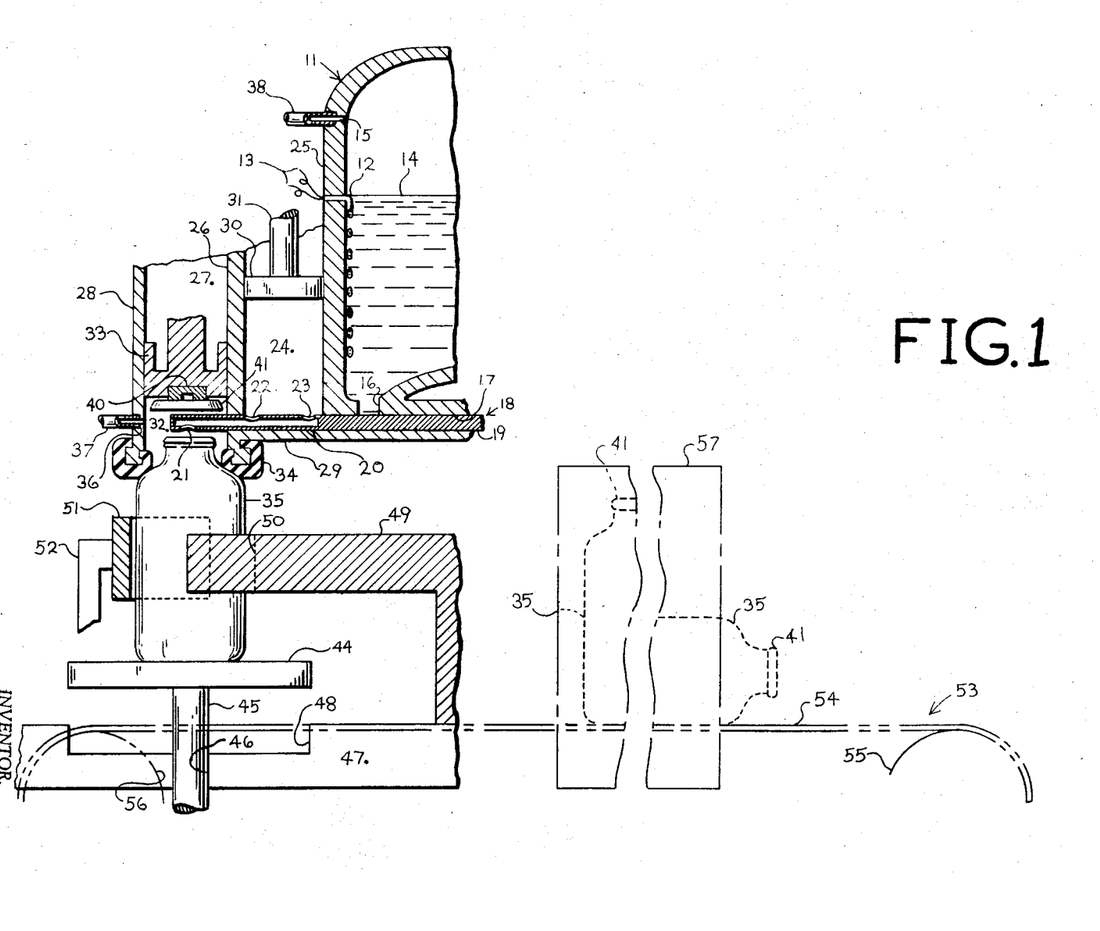
FIG. 1 is a vertical cross section, partially schematic, of one form of the apparatus in which a conveyor for feeding and taking away the containers from the filling zone is shown as if the containers are moved through a lehr from left to right, whereas the actual direction of movement would be normal to this path of travel.

Referring to FIG. 1, the apparatus includes a closed chamber generally indicated at 11 which is connected to a source (not shown) of food. For simplicity the chamber or vessel 11 represents the chamber to contain the food during the heating of the latter to a sterilizing temperature and to maintain the food at a sterilizing temperaure, which is substantially above the atmospheric boiling point of the liquid in the food, and under a pressure such to prevent substantial boiling of the liquid in the food in vessel 11 that is rotated about its vertical axis by motor means (not shown).

An electrical heating element 12 is connected by wires 13 to an electrical source (not shown) and maintains food 14 in vessel 11 at a sterilizing temperature; of course, electrical heating element 12 also represents means to sterilize food 14. The level of food 14 in vessel 11 is below openings 15 in vessel 11. Thus openings 15 are at the level of steam produced by the liquid in food 14 at a sterilizing temperature in vessel 11. This steam is at a pressure that is the vapor pressure of water at the temperature of food 14 in vessel 11. When food 14 is at about 240° F. to 260° F. the steam pressure in the upper part of vessel 11 is 10 p.s.i.g. (pounds per square inch gauge) to above 15 p.s.i.g.

The bottom of vessel 11 has openings 16 through which food 14 can flow downwardly. The openings 16 are arranged in a circle about the axis of rotation of vessel 11. The bottom of each opening 16 connects with a horizontal radial passageway 17 in vessel 11. A slide valve generally indicated at 18 is in each passageway 17. Each slide valve 18 has a part 19 of a solid cylindrical rod construction and another part 20 of tubular construction closed at its free end. The tubular part 20 has a downwardly facing opening 21 near the free end. There are two upwardly facing openings 22 and 23 in part 20 near part 19 of valve 18. Each valve 18 is moved by cam means (not shown).

A chamber 24 is carried alongside of vessel 11 and for simplicity chamber 24 is shown as utilizing a wall 25 of vessel 11 for one of its walls. Another wall 26 of chamber 24 is shown for simplicity as being utilized as a wall also for a chamber 27 which has another wall 28. The relative locations and dimensions of chamber 24, passageway 16, and openings 21, 22 and 23 are such that in one position of valve 18 opening 23 of tubular part 20 communicates with passageway 16 and opening 22 communicates with chamber 24, while opening 21 is closed off by bottom extension 29 of vessel 11 that provides the bottom surface for passageway 17. The slide valve 18 in this case is at a position to the right of that shown in FIG. 1. The food is sucked into chamber 24 when piston 30 is raised. The position to which piston 30 is raised determines the amount of food 14 that will be brought into chamber 24. The movement of piston 30 is provided by cam means (not shown) that moves a rod 31 connected to piston 30.

The locations of openings 21, 22 and 23, of chamber 24 and of passageway 16 are such that, when openings 22 and 23 are both in communication with chamber 24, passageway 16 is closed and opening 21 is no longer facing the bottom part 29 of vessel 11 which would prevent flow of food 14 through opening 21 when the latter faces bottom part 29 so that opening 21 is in effect closed by the bottom part 29 of vessel 11. This condition is shown in FIG. 1 and is attained after slide valve 18 has been moved from right to left. When each valve 18 is at this position the solid part 19 of valve 18 closes passageway 16 and opening 21 is in a chamber 32 which has sidewalls defined by downward extension of those of chamber 27 but chamber 32 is separated from the latter by a piston 33. The rod and its vertical extension are moved by cam means (not shown) automatically in a cycle of operation. The chambers 32 are arranged in a circle having its center coincident with the axis of rotation of vessel 11.

The bottom of chamber 32 including the bottom of walls 26 and 28 is circular in cross section and supports a sealing ring 34 of rubber or other resilient material so that chamber 32, which is the filling chamber, can be hermetically sealed at the bottom when a glass container 35 is lifted up to a position where its shoulder abuts resilient ring 34.

Figure 2:
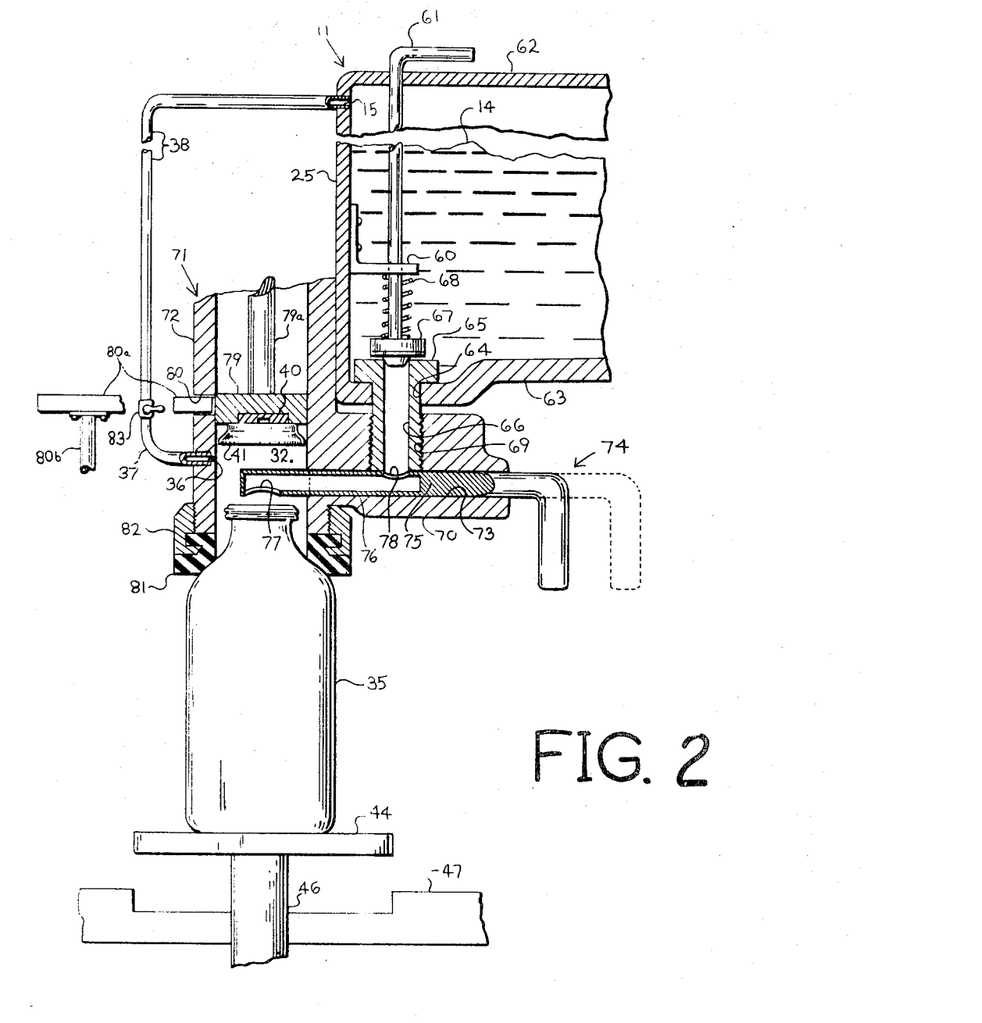
FIG. 2 is a vertical cross section of a second embodiment of the apparatus.

The wall 28 in chamber 32 has an opening 36. A pipe 37 is mounted on wall 28 to communicate with opening 36 and a pipe 38 is mounted on wall 25 to communicate with each passageway 15. When steam pressure in vessel 11 is used to provide steam pressure for chamber 32 pipes 37 and 38 are connected to each other through a 3-way valve and this construction is shown in the embodiment of FIG. 2.

When pipe 37 is connected to a different source of steam or other inert gas that is under a pressure substantially above atmospheric, i.e., an elevated pressure, a suitable valved means (not shown) provides communication alternately with the gaseous pressure source and with the atmosphere. Of course, when pipes 37 and 38 are connected to each other, this is through a valved means, such as the 3-way valve, which alternately communicates pipe 37 with pipe 38 and with the atmosphere.

With slide valve 18 positioned to the left as shown in FIG. 1, opening 21 provides for the flow of food 14 from chamber 24 and also directs the flow of food 14 to container 35 in vertical alignment with opening 21. The slide valve 18 is moved to this position automatically by the cam means mentioned above, after container 35 has been lifted to the position shown with its neck in filling chamber 32, and after chamber 32 has been provided with an elevated gaseous pressure through pipe 37. The piston 33 is then in the position shown in FIG. 1.

The piston 33 supports a magnet 40 which is used to support a closure 41 above valve 18 during the filling operation. In the embodiment shown in FIG. 1, closure 41 is introduced as follows: valve 18 is already moved inward radially, i.e., to the right as viewed in FIG. 1; piston 33 is lowered to a position so that the bottom surface of magnet 40 is slightly below ring 34; a closure 41 is moved by conventional automatic cap-feeding equipment, including a rotary star wheel containing peripheral pockets, to a position below magnet 40 which attracts closure 41 to it and lifts closure 41 from the peripheral pocket; piston 33 is raised to the position as shown in FIG. 1 where magnet 40 holds closure 41 above the path of travel of valve 18.

The container 35 is lifted to the position shown in FIG. 1, i.e., the filling position, by a lift pad 44 mounted on a rod 45 which is lifted by cam means (not shown). The rod 45 extends through an opening 46 in a rotary table 47. The lift pad 44 in its lowered position fits in a recess 48 so that the top surface of lift pad 44 is at the plane of the top surface of turntable 47.

In a conventional manner container holders 49 are mounted on turntable 47 for movement with the latter. Each holder has an arcuate recess 50 in which container 35 fits as shown in FIG. 1. As turntable 47 rotates about its vertical axis containers 35 are fed to recesses 50 of holders 49. The containers 35 are fed one at a time by a star wheel (not shown) at a delivery station onto lift pads 44 in their lowered position. Containers 35 are moved in an arcuate path by the rotation of turntable 47. During this arcuate movement each container 35 is lifted by the raising of the corresponding pad 44 by the cam means mentioned above until container 35 is at the raised position shown in FIG. 1.

During the arcuate movement of container 35 in recess 50 of holder 49 container 35 is prevented from tipping by an arcuate guide plate 51 mounted on a supporting upright 52 that is part of the supporting structure of the apparatus.

After the filling operation, which is described below, lift pad 44 is moved to its lowered position. The sealed and filled container 35 is moved by turntable 47 to a take-off station where container 35 is removed by another star wheel (not shown). Of course, container holder 49 continues its movement with turntable 47 and when it moves through the delivery station another container 35 is delivered by the star wheel feeder. The construction of such a turntable with star wheels for delivery and take-off of containers is well known in the art and is disclosed and described in U.S. Patent 2,968,900 granted to O. Bjering. As illustrated in that patent the containers are taken off the conveyor and, after their filling and closing, are returned to the conveyor downstream from the take-off location.

FIG. 1 shows a conveyor generally indicated at 53 which would usually be disposed at a vertical plane normal to the vertical cross section of FIG. 1. This is apparent from the description of the combination of star wheels, turntable and conveyor mentioned in the last preceding paragraph and illustrated in the Bjering patent.

The conveyor 53 has a conveyor belt 54 which has its top run extending between a driving pulley 55 and an idler pulley 56. The filled and sealed container 35 is moved by conveyor belt 54 through a lehr 57 which is heated to a temperature to insure that food 14 in container 35 is maintained at a sterilizing temperature sufficiently long for the food product to complete the sterilization of the interior of container 35 and the interior of closure 41. The filled and sealed container 35 is shown diagrammatically in two alternative positions in lehr 57, i.e., in a vertical position and in a horizontal position. The filled container 35 can be tilted to the horizontal position by conventional means.

Referring to FIG. 2, which shows a simple embodiment, vessel 11 is not rotated. Its wall 25 supports a guide bracket 60 through which extends a valve rod 61 that also extends through top wall 62 of vessel 11. The bottom 63 of vessel 11 shown in FIG. 2 has a passageway 64 in which is axially mounted a tubular member 65 having a passageway 66. The top of passageway 66 is closed by a valve closure 67 mounted on the bottom end of rod 61. A spring 68 is mounted on rod 61 between bracket 60 and valve closure 67. The spring 68 urges valve closure 67 downwardly to close passageway 66. To communicate passageway 66 with the interior of vessel 11 one raises rod 61.

The bottom part of tubular member 65 is externally threaded and is screwed into a vertical opening 69 in a flange extension 70 of a piston chamber generally indicated at 71 having a cylindrical wall 72. The extension 70 has a horizontal passageway 73 in which is mounted a slide valve generally indicated at 74. The right-hand end portion 75 of valve 74 is solid whereas the left-hand end portion 76 is tubular in construction. The tubular portion 76 is closed at its distal end but at this end it has a downwardly faced opening 77. The tubular portion 76 has an upwardly facing opening 78 near the solid portion 75. The valve 74 is at the position shown in full lines during the filling operation but is moved to the right to the position shown in phantom lines during the capping or sealing operation. With slide valve 74 in the filling position and with valve closure 67 raised, food 14 in vessel 11 flows through passageway 66, opening 78, tubular portion 76 of valve 74, and out opening 77 into a container 35. With valve 74 at its other position to the right opening 77 is shifted to a position wherein it is closed by the wall of the horizontal passageway 73 in the flange extension 70 of piston chamber 71 and the opening 78 is shifted out of communication with passageway 66.

The cylinder 71 has a piston 79 which is mounted on the bottom end of a rod 79a which is manually lowered and which is spring loaded by a spring (not shown) to be normally at its maximum raised position. As in the case of piston 33 of the embodiment shown in FIG. 1, piston 79 suports a magnet 40 which will support a closure 41 at the top of chamber 32 within cylinder 71. The wall 72 has an opening 80 through which closures 41 are fed to chamber 32 by horizontal movement of a closure-feeding elongated trough 80a that is moved horizontally through opening 80 until a closure 41 at the right-hand end (as viewed in FIG. 2) of trough 80a is directly below magnet 40 which is lowered to pick up closure 41 by manually moving piston 79 downward from its maximum raised position. The trough 80a is moved to the left until it is completely out of the path of travel of piston 79 which is then lowered to the position shown in FIG. 2 where piston 79 closes opening 80. Thereafter, the piston 79 is held in this intermediate position by detent means (not shown). The trough 80a is supported by a shaft 80b mounted on means (not shown) to move trough 80a in this horizontal manner. Of course, this is done when piston 79 is raised above opening 80 by the spring.

Instead of ring 34 of the apparatus shown in FIG. 1, a modified circular member 81 of resilient material is mounted on the bottom of cylindrical wall 72 by a retaining ring 82 screwed on the exterior bottom portion of wall 72. The member 81 provides a hermetical seal for the bottom of filling chamber 32 when container 35 is raised to the illustrated position with its top portion in chamber 32 and the open mouth is directly below opening 77 in valve 74. The container is raised to this position by pad 44 which is lifted by rod 46 extending through turntable 47. In this embodiment the turntable is indexed when this occurs.

The vessel 11 has an opening 15 near the top of its side wall 25. The pipe 38 is mounted at this opening. The portion of wall 72 for chamber 32 has an opening 36 and pipe 37 is mounted on wall 72 to communicate with opening 36. The pipes 37 and 38 are connected to each other by a 3-way valve 83. In one position of valve 83 pipes 37 and 38 communicate with each other and in the other position pipe 37 connects with the atmosphere.

Figures 3, 4:
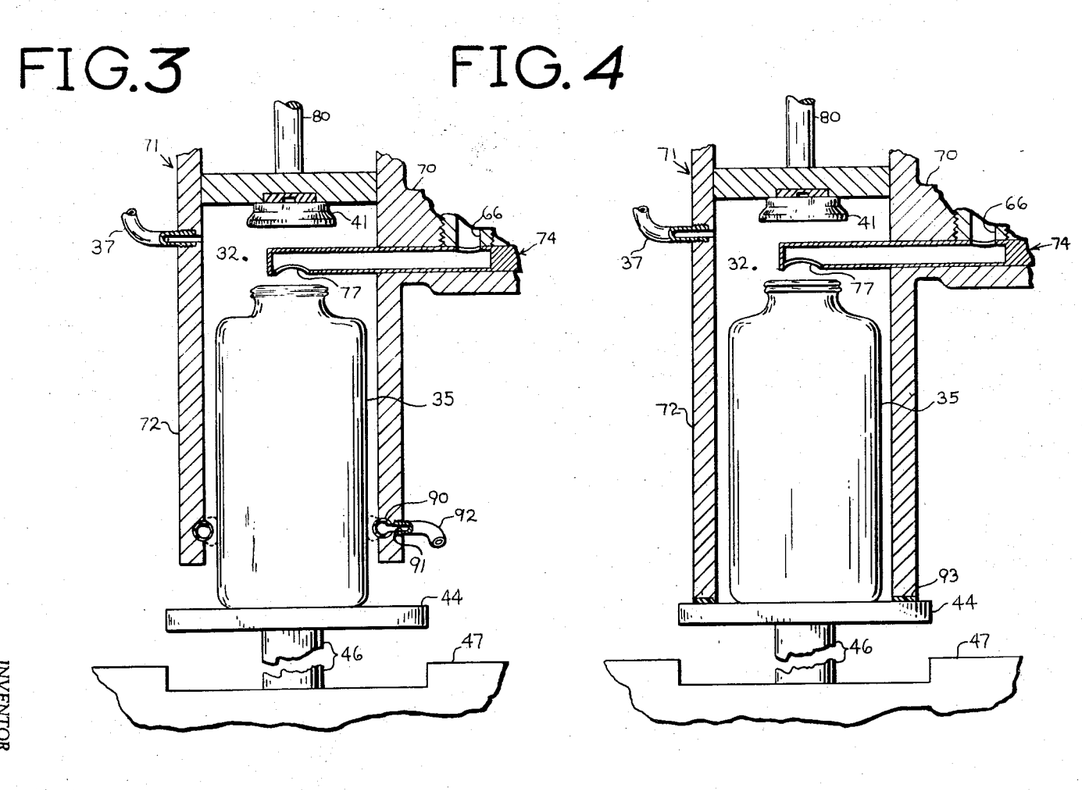
FIGS. 3, 4 and 5 are further fragmentary vertical cross sections of other embodiments of the apparatus of the present invention.

In the apparatus shown in FIGS. 1 and 2 containers 35 are of a shape so that their shoulders can cooperate with resilient member 34 or 81 to close the bottom opening of filling chamber 32. When the container is a glass container that does not have a suitable configuration for this function the apparatus can be modified, e.g., as shown in FIG. 3 by providing a downward extension of cylinder 72 and mounting on the inside surface of this extension an expandable endless rubber tube 90. When tube ring 90 is in its normal condition there is clearance for the upward movement of container 35. When container 35 is properly positioned tube member 90 is expanded by the introduction of compressed air through a passageway 91 communicating with an opening in tube ring 90. A pipe 92 connected to a pressurized gas source (not shown) by suitable valved means is mounted on cylinder 71 at passageway 91. The tube 90 in its inflated condition is shown in phantom lines in FIG. 3. When container 35 is positioned and tube 90 is inflated the bottom opening of chamber 32 is closed.

Except for these modifications the fragmentary view of FIG. 3 represents the embodiment of the apparatus depicted in FIG. 2. This embodiment can be used when bottle 35 is of the configuration shown in FIGS. 1 and 2.

In a further embodiment of the apparatus shown in a fragmentary manner in FIG. 4, which illustrates another modification of the embodiment in FIG. 2, the lower extension of cylinder 71 is not provided with an expandable tube 90 shown in FIG. 3. Instead, a ring 93 of resilient material is mounted on the bottom end of wall 72 so that when container 35 is raised to the filling position, as shown, ring 93 is abutted by lift pad 44. Thus pad 44 and ring 93 provide a seal for the bottom portion of filling chamber 32.

Figure 5:
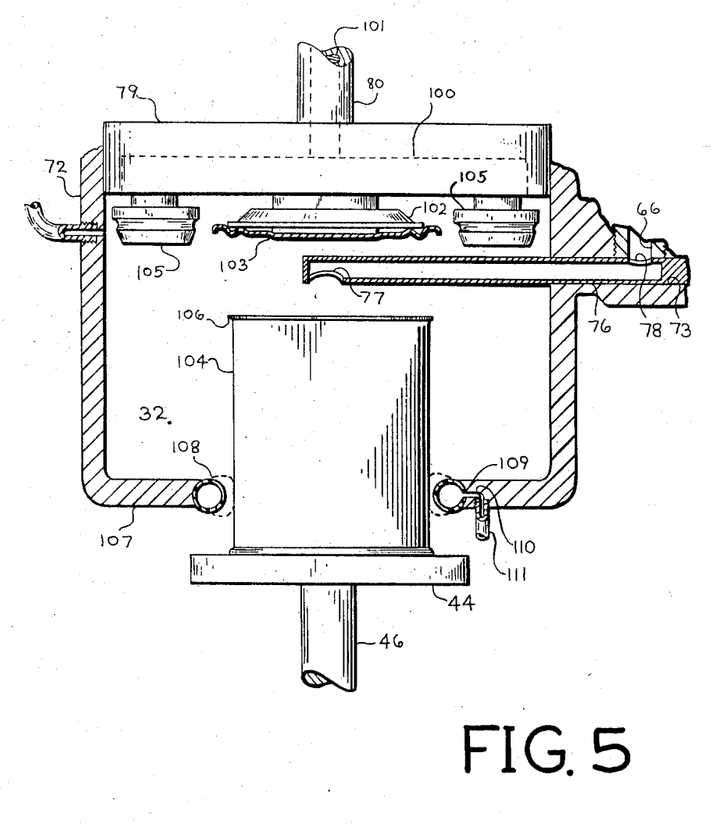

Referring to FIG. 5 which shows a modification of the embodiment of the apparatus in FIG. 2, for use with tin cans in the packaging of food, the cylinder 71 is modified to have a substantially larger diameter. The piston 79 is similarly modified. The piston 79 has a recess which, instead of containing magnet 40, contains a conventional closing head 100, which has a vertically extending rod 101 that extends upwardly through piston rod 80 that is hollow in this instance. The closing head 100 supports a magnetic chuck 102 for support of a cover 103 for a tin can 104 to be filled with food 14 in this embodiment instead of container 35. The closing head 100 also includes a number of seamers 105 that are used to turn together the top rim 106 of can 104 and the periphery of cover 103 to provide the double hermetical seal between cover 103 and can 104 in a conventional manner. The closing head 100 and seamers 105 are shown in numerous patents for canning machines such as U.S. Patent No. 1,601,910 granted to P. W. Fleischer et al.

In the embodiment of FIG. 5 slide valve 74 is modified so that tubular portion 76 is substantially longer so that opening 77 is above the vertical axis of can 104 when opening 78 of valve 74 is in communication with passageway 66. The cylinder 71 has an inwardly turned flange 107 in the bottom of cylindrical wall 72 to reduce the diameter of the bottom opening of modified chamber 32. On the inner periphery of flange 107 a tubular ring 108 of pressure-expandable material is mounted. The ring 108 has an opening 109 communicating with a passageway 110 in flange 107. A tubing 111 is connected to flange 107 to communicate passageway 110 with a pressurized gas source when it is desired to expand tubular ring 108 to the position, shown in phantom lines in FIG. 5, where ring 108 will abut can 104 to close the bottom opening of chamber 32. Of course, ring 108 is in its normal condition, which is depicted in solid lines, when can 104 is raised or lowered into chamber 32.

The piston 79 is raised from the position shown in FIG. 5 to insert closure or cover 103 into chamber 32 in the manner shown in FIGS. 1 and 2. When the bottom opening of the filling chamber of cylinder 32 is sufficiently large cover 103 can be introduced into chamber 32 by resting cover 103 on can 104 when it is lifted into chamber 32. Of course, in this case slide valve 74 is first moved to the far right so that piston 79 can be lowered to a position for magnetic chuck 102 to engage cover 103 and then piston 79 is raised to the position shown in FIG. 5 where cover 103 is above the path of travel of slide valve 74.

Earlier it was mentioned that the apparatus can have a number of filling chambers which would be arranged in a circle concentric with the path of travel of lift pad 44. This is the embodiment of FIG. 1. The vessel 11 is a holding chamber or pressure filler bowl through which sterilized food is fed from continuous-flow sterilizing equipment. The residence time of the sterilized food in filler bowl or vessel 11 is relatively short.

With automatic equipment using continuous movement of turntable 47, as described for the embodiment of FIG. 1, the cap-feeding unit would place a closure 41 below each magnet 40 at a station between the takeout station for the removal of a sealed container and a container-delivery station which use star wheels. At the cap-feeding station magnet 40 would be below ring 34.

The food 14 in reservoir 11 is held at a temperature above the atmospheric boiling point of the liquid, as mentioned above. For example, food 14 in the case of a baby milk formula would be held at 240° F. to 250° F. and the residence time in vessel 11 would be preferably less than five minutes.

In FIG. 2 heating means for maintaining food 14 is not shown but would, of course, be used as in the embodiment of FIG. 1.

*Operation*

The method of the invention is described in connection with the apparatus of FIG. 1. The turntable is rotating. At the cap-feeding station closure 41 is fed to lowered magnet 40 and then piston 33 by the cam means is raised during the next part of movement of turntable 47 so that closure 41 will be above the path of travel of valve 18. When chamber 32 containing closure 41 moves through the container-delivery station container 35 is placed on pad 44. As turntable 47 continues its rotation pad 44 lifts container 35 to abut ring 34 and to close chamber 32. The pipe 37 which has been in communication with the atmosphere is then automatically placed in communication with pipe 38 to introduce steam into chamber 32 until the pressure in chamber 32 equals the steam pressure in the top part of vessel 11. While turntable 47 continues to move, valve 18 is moved radially outward and piston 30 is lowered by their own cam means, so that food 14 will be displaced from chamber 24 and fed to container 35. The rapidly moving piston 30 will cause an increase in gaseous pressure in filling chamber 32 and this pressure increase can be overcome by a spring-release port (not shown) to vent gas to the atmosphere.

After piston 30 completes its downward travel, cam means move valve 18 radially inward and piston 30 upward whereby food 14 is then sucked into chamber 24 for the next cycle of operation. Other cam means lower piston 33 and magnet 40 to bring closure 41 down to the finish of container 35 with sufficient pressure to provide a pressure-tight hermetic seal between closure 41 and container 35. This cam means then lifts piston 33 and magnet 40 but the latter does not lift closure 41. The valved means for pipe 37 then automatically closes pipe 38 and opens pipe 37 to the atmosphere to release the gaseous superatmospheric pressure in chamber 32.

Its cam means lowers pad 44 until the latter is at its lowermost position. Then the filled and sealed container 35 reaches the take-out station where container 35 is removed from turntable 47 onto conveyor 53 and then through lehr 57. The turntable moves this unit comprising chamber 32, piston 33, etc. toward the cap-feeding station while its cam means lowers piston 33 below ring 34. At the cap-feeding station the next cycle begins.

In the case of glass containers various types of closures can be used. They can be of the screw or lug type or of the crown type. A side type of closure is preferred and the finish of the glass container is designed to hold the cap or closure although the internal pressure is quite substantial until the sealed container is cooled after the completion of the sterilization.

Instead of using containers with conventional openings and closures or caps, it is apparent that containers with small openings that can be closed with a hermetic seal by a drop of solder can be used in carrying out the present invention. Also in the present method containers with unitary tops that are self-sealing can be punctured by a hypodermic-type of tube for filling so that the container is automatically sealed upon removal of the tube.

It is apparent from the foregoing description and especially when the construction shown in the drawings is included, that a fresh supply of pressurized gas is used for each cycle. None of the displaced gas in one cycle of operation is retained in a chamber that is not opened to the atmosphere, when filling chamber 32 is, and is then used in the next cycle to pressure filling chamber 32. The same can be stated for the description, taken in conjunction with the drawings, or said copending application Ser. No. 285,619.

It is further obvious from the foregoing description and the drawings, that food 14 transferred into chamber 32 through opening 21 flows downwardly as a stream into container 35 and thereby displaces gas in container 35. The displaced gas goes out the open upper end or mouth of container 35 into chamber 32 which is in communication directly with the open end of container 35 until the latter is sealed. The chamber 32 is also in communication directly with and surrounds at least the top part of container 35.

The displaced gas mixes with gas already in chamber 32. If the time of the cycle of operation would be of substantial duration this mixture may mix with gas in pipe 37. The valve 83 would be placed remote from opening 36 of chamber 32 if such is likely to occur. However, with the filling speeds used for commercial operation, no appreciable amount of displaced gas will enter pipe 37. Before such would occur container 35 would be sealed and the gaseous pressure in chamber 32 would be released to the atmosphere. During the filling of container 35 with food 14, it is also obvious that chamber 32 remains in communication with the open end of container 35. The foregoing is described and shown in said copending application Ser. No. 285,619.

It is preferred that the pressurizing gas be introduced into chamber 32 through gas inlet 36 before chamber 32 is closed, so that container 35 can be purged of part or all of its air. In such case inlet 36 could be downwardly inclined to direct the purging and pressurizing gas, such as stream, into container 35. A different location for the gas inlet to accomplish such purging more efficiently is described and shown in said copending application, Ser. No. 285,619. The purging gas can be entering open chamber 32 until the latter is closed, as there described, and thereafter an elevated gaseous pressure is created in chamber 32, as already described in the present application.

The method of the present invention can be restated in broad terms as a method of packaging to provide a sterile liquid-containing food at least partially filling a number of sealed containers having their interiors in sterile condition by the performance of a number of cycles of operation. Each cycle of operation comprises the steps of (a) placing at least the open end of a container in a filling chamber, (b) closing the chamber to seal it from communication with the atmosphere, (c) communicating the chamber with a pressurized gas source by a gas inlet in the chamber to introduce gas into the chamber to provide a predetermined elevated gaseous pressure, (d) sterilizing a liquid-containing food, that is flowable at the filling temperature, by heating it to and maintaining it at a temperature substantially above the atmospheric boiling point of the liquid in the food and under a pressure at least equal to the vapor pressure of the liquid in the food at the sterilizing temperature, (e) transferring the food at a sterilizing temperature to the container at least partially in the chamber while maintaining the chamber at an elevated gaseous pressure sufficiently high to prevent substantial boiling of the food, whereby gas in the container is displaced by the food into the chamber, (f) hermetically sealing the container with the food in it, (g) closing the communication between the gas source and the chamber, (h) opening the chamber to the atmosphere for releasing the elevated gaseous pressure in the chamber, and (i) subsequently removing the hermetically-sealed container containing the food from the chamber. However, to obtain the beneficial results and to avoid deficiencies of methods of the prior art, such as U.S. Patent No. 1,842,969 granted to W. A. Heyman, the present method uses many, but not all (primarily because some are alternatives), of the following steps:

(1) retaining communication between the chamber and the open end of the container during steps (b) through (e);

(2) communicating the chamber with the pressurized gas source during the cycle of operation only through the gas inlet in the chamber used to introduce pressurized gas in step (c) with or without purging of the chamber and the container prior to step (b) by use of the pressurized gas, so that only a fresh supply of pressurized gas is used;

(3) transferring the food into the container in step (e) by transferring first into said chamber through a different inlet, i.e., an inlet in the chamber other than the gas inlet;

(4) maintaining communication between the chamber and the source of pressurized gas during transfer of the food into the chamber and then into the container when using step (e);

(5) venting gas from the chamber during step (e) to maintain a predetermined maximum elevated gaseous pressure in the chamber;

(6) preventing, except by passage through the gas inlet, passage from the container of the displaced gas from step (e) from moving outside the chamber to any zone, which is at an elevated gaseous pressure when the chamber is initially provided with an elevated gaseous pressure by step (c);

(7) releasing during step (h) the elevated gaseous pressure in the entire space of the chamber and in any zone that receives displaced gas through the gas inlet and that is closed during step (g) from communication with the source of pressurized gas;

(8) accumulating in the chamber during step (e) all displaced gas remaining as a gaseous mixture at an elevated pressure; and (9) opening the chamber to the atmosphere to release the accumulated displaced gas as a gaseous mixture to the atmosphere.

From the foregoing description in another way the present invention can be described as a method of packaging containers with a liquid-containing sterile food obtained by sterilizing a liquid-containing food at a temperature substantially above the atmospheric boiling point of the liquid in the food and under a pressure at least equal to the vapor pressure of the liquid in the food at the sterilizing temperature, which comprises using cycles of operation and for each cycle:

(1) placing at least part of a container having a top part with an open end within a chamber so that gas in the chamber when closed communicates directly with the open end of the container and preferably also with the outer surface of at least the top part of the container for the entire cycle of operation;

(2) providing in the chamber and thereby in the container a predetermined elevated gaseous pressure by introducing through a gas inlet of the chamber only a fresh supply of pressurized gas, i.e., by introducing pressurized gas directly from and only from a source of pressurized gas used for each cycle, whereby pressurized gas displaced from a container in a preceding cycle is not used;

(3) transferring the sterile food at a sterilizing temperature and under a pressure at least equal to the vapor pressure of the liquid in the food through an inlet of the chamber other than the gas inlet into said chamber and then into the container in the chamber maintained at an elevated gaseous pressure sufficiently high to prevent substantial boiling of the food under conditions to displace gas at said elevated pressure from the container by the food directly into the entire gas-containing space of the chamber;

(4) hermetically sealing the container;

(5) closing the gas inlet to cease communication between the chamber and the source of pressurized gas;

(6) releasing the gaseous pressure in the chamber to provide the entire space of the chamber with a gas at atmospheric pressure; and (7) removing the hermetically-sealed container from the chamber.

From an apparatus standpoint the present invention can be described as directed to an apparatus for packaging a liquid-containing food in a container in which the apparatus has (1) a filling chamber with
   (a) a gas inlet;
   (b) a different inlet for the food;
   (c) a support for means to hermetically seal an open end container;
   (d) an opening to receive the container in the chamber; and
   (e) a gas-containing space communicating with the inlets, the opening and the support means;

(2) a container support means;

(3) means to provide relative movement of said chamber and said container support means between a first relative position and a second relative position, whereby the container on said support is completely outside said chamber in said first position and is at least partially inside said chamber in communication with said gas-containing space in said second position;

(4) means to hermetically close said opening of said chamber at least when said chamber and said support with the container thereon are in said second relative position;

(5) valved means extending through and to provide said gas inlet alternately in communication with the atmosphere and with only a source of pressurized gas; and (6) means to transfer sterile food through said different inlet and into the container on said support, said chamber and said food transfer means having a construction to permit gas in the container displaced by transferred food to move entirely into said gas-containing space of said chamber.

In the specific embodiment shown the bottom of the chamber has the opening and the relative motion between the container support and the filling chamber is vertical while the chamber is provided in the opening with a ring of resilient material that when it is abutted by a shoulder of a container hermetically closes the chamber. When the different inlet is horizontally disposed, as is shown in the drawings, the food transfer means includes a rod extending through said different inlet and having a longitudinal bore closed at an end within said filling chamber and having a downwardly facing discharge opening adjacent said closed end and an upwardly facing opening to receive food from a food source, said rod being slidably disposed into said chamber.

As shown the apparatus can provide for means to sterilize the food, at a temperature substantially above the atmospheric boiling point of the liquid and under a pressure at least equal to the vapor pressure of the liquid in the food at the sterilizing temperature, by using a closed sterilizing chamber that will contain only in its lower part the food being sterilized so that an upper part of the chamber contains an elevated vapor pressure of steam that is produced by the hot sterilized food. This vapor pressure of steam is used as the elevated gaseous source to provide the desired pressure in the filling chamber.

The foregoing description of embodiments of the method and the apparatus have been presented solely for the purpose of illustration and not by way of limitation. Various modifications will be apparent to one skilled in the art. The method and apparatus of this invention are limited only by the claims that follow:

What is claimed is:

1. A method of packaging a liquid-containing food in a container which comprises:

(1) sterilizing said food at a temperature substantially above the atmospheric boiling point of the liquid and under a pressure at least equal to the vapor pressure of the liquid in the food at the sterilizing temperature;
(2) providing within a chamber at least part of a container having an open end so that gas in said chamber when closed communicates directly with at least said open end of said container until said end is closed;
(3) providing in said chamber and thereby in said container a predetermined elevated gaseous pressure by introducing through a gas inlet of said chamber pressurized gas directly from and only from a source of pressurized gas;
(4) transferring said sterile food at a sterilizing temperature and under a pressure at least equal to the vapor pressure of the liquid in the food through an inlet of said chamber other than said gas inlet into said chamber and then into said container in said chamber maintained at an elevated gaseous pressure sufficiently high to prevent substantial boiling of said food to displace gas by said food from said container into the gas-containing space of said chamber;
(5) hermetically sealing said container;
(6) closing said gas inlet to cease communication between said chamber and said source of pressurized gas;
(7) releasing the gaseous pressure in said chamber to provide said space of said chamber at atmospheric pressure; and
(8) removing the hermetically-sealed container from the chamber.

2. The method of claim 1 wherein the gaseous pressure in the chamber in step (4) is at least equal to the vapor pressure of the liquid in the food in the container.

3. A method of packaging a liquid-containing food in a container which comprises:
(1) sterilizing said food at a temperature substantially above the atmospheric boiling point of the liquid and under a pressure at least equal to the vapor pressure of the liquid in the food at the sterilizing temperature;
(2) providing within a chamber at least part of a container having an open end so that gas in said chamber when closed communicates directly with at least said open end of said container until said end is closed;
(3) providing in said chamber and thereby in said container a predetermined elevated gaseous pressure by introducing through a gas inlet of said chamber pressurized gas directly from and only from a source of pressurized gas;
(4) transferring said sterile food at a sterilizing temperature and under a pressure at least equal to the vapor pressure of the liquid in the food through an inlet of said chamber other than said gas inlet into said chamber and then into said container in said chamber maintained at an elevated gaseous pressure sufficiently high to prevent substantial boiling of said food to displace gas by said food from said container into the gas-containing space of said chamber;
(5) hermetically sealing said container;
(6) closing said gas inlet to cease communication between said chamber and said source of pressurized gas;
(7) releasing the gaseous pressure in said chamber to provide said space of said chamber at atmospheric pressure;
(8) removing the hermetically-sealed container from the chamber; and
(9) maintaining said food in said sealed container at an elevated temperature sufficiently high for the vapor of the liquid and the liquid to sterilize the entire inner surface of said sealed container.

4. A method of packaging a liquid-containing food in a container which comprises:
(1) sterilizing said food at a temperature substantially above the atmospheric boiling point of the liquid and under a pressure at least equal to the vapor pressure of the liquid in the food at the sterilizing temperature;
(2) providing within a chamber at least part of a container having an open end so that gas in said chamber when closed communicates directly with at least said open end of said container until said end is closed;
(3) providing in said chamber and thereby in said container a predetermined elevated gaseous pressure by introducing through a gas inlet of said chamber pressurized gas directly from and only from a source of pressurized gas;
(4) transferring said sterile food at a sterilizing temperature and under a pressure at least equal to the vapor pressure of the liquid in the food through an inlet of said chamber other than said gas inlet into said chamber and then into said container in said chamber maintained at an elevated gaseous pressure sufficiently high to prevent substantial boiling of said food to displace gas by said food from said container into the gas-containing space of said chamber;
(5) hermetically sealing said container;
(6) closing said gas inlet to cease communication between said chamber and said source of pressurized gas;
(7) releasing the gaseous pressure in said chamber to provide said space of said chamber at atmospheric pressure;
(8) removing the hermetically-sealed container from the chamber;
(9) tilting said sealed container to place the upper inner surface of said sealed container in direct contact with said food; and
(10) maintaining the temperature of said food sufficiently high to sterilize the inner surface of said sealed container.

5. The method of claim 4 wherein the gaseous pressure in the chamber in step (4) is at least equal to the vapor pressure of the liquid in the food in the container.

6. A method of packaging a liquid-containing food in a container which comprises:
(1) sterilizing said food at a temperature substantially above the atmospheric boiling point of the liquid and under a pressure at least equal to the vapor pressure of the liquid in the food at the sterilizing temperature;
(2) providing within a chamber at least part of a container having a top part including an open mouth so that gas in said chamber when closed communicates directly with at least said top part of said container until said container is removed;
(3) providing in said chamber and thereby in said container a predetermined elevated gaseous pressure by introducing through a gas inlet of said chamber pressurized gas directly from and only from a source of pressurized gas;
(4) transferring said sterile food at a sterilizing temperature and under a pressure at least equal to the vapor pressure of the liquid in the food through a different inlet of said chamber into said chamber and then into said container in said chamber maintained at an elevated gaseous pressure sufficiently high to prevent substantial boiling of said food to displace gas by said food from said container into the gas containing space of said chamber;
(5) hermetically sealing said container;
(6) closing said gas inlet to cease communication between said chamber and said source of pressurized gas;

(7) releasing the gaseous pressure in said chamber to provide said space of said chamber at atmospheric pressure; and (8) removing the hermetically-sealed container from the chamber.

7. A method of packaging an aqueous-containing food in a container which comprises:

(1) sterilizing said food at a temperature substantially above 212° F. and under a pressure at least equal to the vapor pressure of water in the food at the sterilizing temperature;

(2) providing within a chamber at least part of a container having a top part including an open mouth so that gas in said chamber when closed communicates directly with at least said top part of said container until said container is removed;

(3) providing in said chamber and thereby in said container a predetermined steam pressure by introducing through a gas inlet of said chamber steam directly from and only from a source of steam;

(4) transferring said sterile food at a sterilizing temperature and under a pressure at least equal to the vapor pressure of water in the food through a different inlet of said chamber and then into said container in said chamber maintained at an elevated gaseous pressure sufficiently high to prevent substantial boiling of said food to displace gas by said food from said container into the gas-containing space of said chamber;

(5) hermetically sealing said container;

(6) closing said gas inlet to cease communication between said chamber and said source of steam;

(7) releasing the gaseous pressure in said chamber to provide said space of said chamber at atmospheric pressure; and (8) removing the hermetically-sealed container from the chamber.

8. The method of claim 7 wherein the steam pressure in the chamber in step (3) is at least equal to the vapor pressure of the water in the food at the sterilizing temperature in the chamber and wherein the sterilizing temperature for the food is between about 240° F. and about 260° F.

9. The method of claim 8 wherein the hermetical sealing step is provided by a closure previously placed in said chamber.

10. The method of claim 9 wherein said container and said closure are only partially sterilized before being placed in said chamber and wherein subsequent to removal of said sealed container from said chamber said container is subjected before cooling to the following steps:

(1) tilting said sealed container to place the upper inner surface of said sealed container and said closure in direct contact with said food; and (2) maintaining the temperature of said food sufficiently high to sterilize the inner surface of said sealed container and said closure, but at a temperature and for a time insufficient to sterilize said container and said closure without said partial sterilization.

11. A method of packaging a baby-food formula substitute for milk in a container which comprises:

(1) sterilizing said food at a temperature of between about 240° F. and about 260° F. and under a pressure at least equal to the vapor pressure of water in the food at the sterilizing temperature;

(2) placing at least part of a container having an open upper end within a chamber so that gas in said chamber when closed communicates directly with at least said open end of said container until said end is closed;

(3) introducing steam through a gas inlet of said chamber to purge at least some air from said chamber;

(4) hermetically closing said chamber;

(5) providing in said chamber and thereby in said container a predetermined elevated steam pressure by introducing through said gas inlet of said chamber a fresh supply only of steam from a source of steam;

(6) transferring said sterile food at a sterilizing temperature and under a steam pressure at least equal to the vapor pressure of the liquid in the food through a different inlet of said chamber into said chamber and then into said container in said chamber maintained at an elevated steam pressure sufficiently high to prevent substantial boiling of said food to displace gas by said food from said container into the gas-containing space of said chamber;

(7) hermetically sealing said container;

(8) closing said gas inlet to cease communication between said chamber and said source of pressurized gas;

(9) releasing the gaseous pressure in said chamber to provide said space of said chamber at atmospheric pressure; and (10) removing the hermetically-sealed container from the chamber.

12. A method of packaging a baby food formula substitute for milk in a container which comprises:

(1) sterilizing said food at a temperature of between about 240° F. and about 260° F. and under a pressure at least equal to the vapor pressure of water in said food at the sterilizing temperature;

(2) placing a closure in a chamber through an opening in said chamber;

(3) placing at least part of a container having an open upper end within a chamber having an opening so that gas in said chamber when closed communicates directly with at least said open end of said container until said end is closed;

(4) introducing steam through a gas inlet of said chamber to purge at least some air from said chamber;

(5) hermetically closing said chamber;

(6) providing in said chamber and thereby in said container a predetermined elevated steam pressure by introducing through said gas inlet of said chamber a fresh supply only of steam from a source of steam;

(7) transferring said sterile food at a sterilizing temperature and under a pressure at least equal to the vapor pressure of the water in the food through a different inlet of said chamber into said chamber and then into said container in said chamber maintained at an elevated steam pressure sufficiently high to prevent substantial boiling of said food to displace gas by said food from said container into the gas-containing space of said chamber;

(8) hermetically sealing said container by placing said closure on said open end of said container in hermetically sealed relationship;

(9) closing said gas inlet to cease communication between said chamber and said source of pressurized gas;

(10) releasing the gaseous pressure in said chamber to provide said space of said chamber at atmospheric pressure; and (11) removing the hermetically-sealed container from the chamber.

13. The method of claim 12 wherein during step (6) there is venting of gas to the atmosphere when necessary to prevent any increase in gaseous pressure in said chamber above said predetermined elevated pressure provided by step (5).

14. The method of claim 13 wherein said container and said closure are only partially sterilized before being placed in said chamber and wherein subsequent to removal of said sealed container from said chamber said container is subjected before cooling to the following steps:

(1) tilting said sealed container to place the upper inner surface of said sealed container and said closure in direct contact with said food; and (2) maintaining the temperature of said food sufficiently high to sterilize the inner surface of said sealed container and said closure, but at a temperature and for a time insufficient to sterilize said container and said closure without said partial sterilization.

15. A method of packaging a liquid-containing food in a container which comprises:

(1) sterilizing said food at a temperature substantially above the atmospheric boiling point of the liquid and under a pressure at least equal to the vapor pressure of the liquid in the food at the sterilizing temperature;

(2) providing within a chamber at least part of a container having an open end so that gas in said chamber when closed communicates directly with at least said open end of said container until said end is closed;

(3) providing in said chamber and thereby in said container a predetermined elevated gaseous pressure by introducing through a gas inlet of said chamber pressurized gas directly from and only from a source of pressurized gas;

(4) transferring said sterile food at a sterilizing temperature and under a pressure at least equal to the vapor pressure of the liquid in the food through an inlet of said chamber other than said gas inlet into said chamber and then into said container in said chamber maintained at an elevated gaseous pressure sufficiently high to prevent substantial boiling of said food to displace gas by said food from said container into the gas-containing space of said chamber;

(5) venting to the atmosphere gas from said chamber during said transfer of said food to prevent any increase in gaseous pressure above said predetermined elevated gaseous pressure.

(6) hermetically sealing said container;

(7) closing said gas inlet to cease communication between said chamber and said source of pressurized gas;

(8) releasing the gaseous pressure in said chamber to provide said space of said chamber at atmospheric pressure; and (9) removing the hermetically-sealed container from the chamber.

16. A method of packaging a liquid-containing food in a container which comprises:

(1) sterilizing said food at a temperature substantially above the atmospheric boiling point of the liquid and under a pressure at least equal to the vapor pressure of the liquid in the food at the sterilizing temperature;

(2) providing within a chamber at least part of a container having an open end so that gas in said chamber when closed communicates directly with at least said open end of said container until said end is closed;

(3) introducing gas through a gas inlet of said chamber in a manner to purge said chamber and said container of a substantial amount of contained air;

(4) providing in said chamber and thereby in said container a predetermined elevated gaseous pressure by introducing through said gas inlet of said chamber pressurized gas directly from and only from a source of pressurized gas;

(5) transferring said sterile food at a sterilizing temperature and under a pressure at least equal to the vapor pressure of the liquid in the food through an inlet of said chamber other than said gas inlet into said chamber and then into said container in said chamber maintained at an elevated gaseous pressure sufficiently high to prevent substantial boiling of said food to displace gas by said food from said container into the gas-containing space of said chamber;

(6) hermetically sealing said container;

(7) closing said gas inlet to cease communication between said chamber and said source of pressurized gas;

(8) releasing the gaseous pressure in said chamber to provide said space of said chamber at atmospheric pressure; and (9) removing the hermetically-sealed container from the chamber.

17. The method of claim 16 wherein the liquid of said food is water, the gas introduced through said gas inlet is steam, and the step of hermetically sealing is accomplished by use of an open mouthed container and a closure inserted in said chamber before said container is at least partially inserted.

18. A method of packaging an aqueous-containing food in a container which comprises:

(1) sterilizing said food without boiling at a temperature substantially above 212° F. and under a vapor pressure created by the water in the food at this temperature;

(2) providing the sterilized food without boiling and at the elevated temperature in a lower part only of a zone so that an upper part of the zone contains an elevated pressure of steam produced by the hot sterilized food;

(3) placing a closure for a container within a filling chamber;

(4) placing at least part of said container having an open mouth within said chamber so that gas in said chamber when closed communicates directly with at least said open mouth of said container until said mouth is closed by said closure;

(5) introducing steam into said chamber through a gas inlet of said chamber to purge at least some air from said chamber;

(6) hermetically closing said chamber;

(7) providing in said chamber and thereby in said container a predetermined elevated steam pressure by introducing through said gas inlet of said chamber steam only from said upper part of said zone;

(8) transferring said sterile food at a sterilizing temperature and under a pressure at least equal to the vapor pressure of the water in the food through a different inlet of said chamber into said chamber and then into said container in said chamber maintained at said predetermined elevated pressure to displace gas by said food from said container into the gas-containing space of said chamber;

(9) hermetically sealing said container by placing said closure on said container;

(10) closing said gas inlet to cease communication between said chamber and said steam in said upper part of said zone;

(11) releasing the gaseous pressure in said chamber to provide said space of said chamber at atmospheric pressure; and (12) removing the hermetically-sealed container from the chamber.

19. An apparatus for packing a liquid-containing food in a container which comprises:

(1) a filling chamber having
 (a) a gas inlet;
 (b) a different inlet for the food;
 (c) a support for means to hermetically seal an open end container;
 (d) an opening to receive the container in the chamber; and
 (e) a gas-containing space communicating with the inlets, the opening and the support means;

(2) a container support means;

(3) means to provide relative movement of said chamber and said container support means between a first relative position and a second relative position, whereby the container on said support is completely outside said chamber in said first position and is at least partially inside said chamber in communication with said gas containing space in said second position;

(4) means to hermetically close said opening of said chamber at least when said chamber and said support with the container thereon are in said second relative position;

(5) valved means extending through and to provide said gas inlet alternately in communication with the atmosphere and with only a source of pressurized gas;

(6) chamber means to receive, contain and supply a quantity of said liquid-containing food;

(7) means communicating with said supply chamber and adapted to transfer said liquid-containing food from said supply chamber to said different inlet and into the container on said support; and (8) heating means to insure that said liquid-containing food can be supplied to said transfer means and thereby to said container, at least partially in said filling chamber, at a sterilizing temperature, said chamber and said food transfer means having a construction to permit gas in the container displaced by transferred food to move entirely into said gas-containing space of said filling chamber, said supply chamber and said food transfer means further having a construction to permit said supply chamber and said food transfer means, during use of the apparatus, with said heating means to provide the sterilized food to said container under an elevated gaseous pressure sufficiently high to prevent substantial boiling of the food at said sterilizing temperature.

20. The apparatus of claim 19 wherein:

(1) the bottom of said chamber has said opening; and (2) said relative movement means is constructed to provide vertical movement, and wherein a ring of resilient material is mounted on said chamber at said opening of said chamber to be abutted by the shoulder of a container to provide special means to close said chamber.

21. The apparatus of claim 20 wherein:

(1) said different inlet is horizontally disposed; and (2) said food transfer means includes a rod extending through said different inlet and having a longitudinal bore closed at an end within said filling chamber and having a downwardly facing discharge opening adjacent said closed end and an upwardly facing opening to receive food from a food source, said rod being slidably disposed into said chamber.

22. The apparatus of claim 19 and further including means to sterilize the food, at a temperature substantially above the atmospheric boiling point of the liquid and under a pressure at least equal to the vapor pressure of the liquid in the food at the sterilizing temperature, comprising a closed sterilizing chamber to contain the food and means to heat said sterilizing chamber and wherein said valved means communicates with an upper part of said sterilizing chamber to provide steam for said gas inlet to pressurize said filling chamber.

References Cited

UNITED STATES PATENTS

| | | | |
|---|---|---|---|
| 2,153,542 | 4/1939 | Ball | 99—184 |
| 2,541,113 | 2/1951 | Smith | 99—184 |
| 2,874,523 | 2/1959 | Ryan | 53—22 |
| 2,885,845 | 5/1959 | Ryan | 53—112 |
| 2,931,150 | 4/1960 | Ryan | 53—112 |
| 2,972,214 | 2/1961 | Juin | 53—37 |

MAURICE W. GREENSTEIN, *Primary Examiner.*

A. LOUIS MONACELL, *Examiner.*